United States Patent [19]

Sato et al.

[11] 4,240,699
[45] Dec. 23, 1980

[54] ZOOM LENS HAVING EXTENDED FOCUSING RANGE

[75] Inventors: Yasuhisa Sato, Kawasaki; Sadahiko Tsuji, Yokohama; Katsumi Tanaka, Toyko, all of Japan

[73] Assignee: Canon Kabushiki Kaisha, Tokyo, Japan

[21] Appl. No.: 902,499

[22] Filed: May 3, 1978

Related U.S. Application Data

[63] Continuation of Ser. No. 737,342, Nov. 1, 1976, abandoned.

[30] Foreign Application Priority Data

Nov. 5, 1975 [JP] Japan .................. 50/133321

[51] Int. Cl.³ .............................. G02B 15/18
[52] U.S. Cl. .................................. 350/184
[58] Field of Search ............ 350/184, 186, 176

[56] References Cited

U.S. PATENT DOCUMENTS

| 3,336,094 | 8/1967 | Macher ................ 350/184 |
| 3,615,125 | 10/1971 | Higuchi et al. ........ 350/184 |

FOREIGN PATENT DOCUMENTS 44-28676 11/1969 Japan ....................... 350/184

*Primary Examiner*—Paul A. Sacher
*Attorney, Agent, or Firm*—Toren, McGeady and Stanger

[57] ABSTRACT

A method of designing a telephoto type zoom lens having a convergent front member movable for focusing and capable of providing focusing down to as short an object distance as 6.5 times the longest focal length to achieve good stabilization of correction of spherical aberration on adjustment of the other aberrations within predetermined limits throughout the extended focusing range even when zooming is effected to the telephoto settings. This is accomplished by means of the formula:

$$F(Ao, Lo) = \phi^3 h^4 Ao(1 - \lambda^4 - 4a\beta + 6a^2\beta^2) + 4\phi^2 h^2 Lo(-\beta + 3a\beta^2) - \beta(\alpha')^2 + \beta^2\{2\phi(3 + Po) + 3\alpha'\alpha'\}$$

In the case of the telephoto type zoom lens comprising, in addition to such front component, a divergent second component or variator, a convergent or divergent third component or compensator and a convergent fourth component or relay lens, $$-0.25 \leq F(Ao, Lo) \leq 0.25$$

is found as acceptable.

3 Claims, 41 Drawing Figures

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

FIG.3A
FIG.3B
FIG.3C
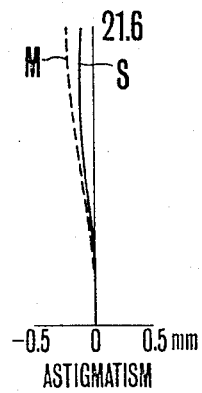
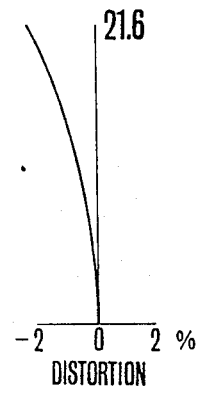
-0.5  0  0.5 mm
SPHERICAL ABERRATION
-0.5  0  0.5 mm
ASTIGMATISM
-2  0  2 %
DISTORTION
FIG.3D
FIG.3E
FIG.3F
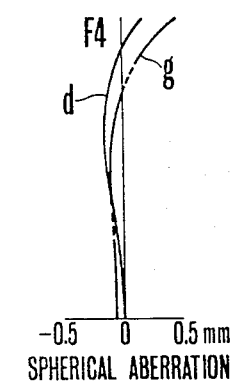
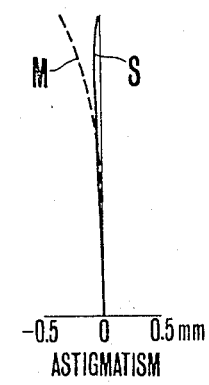
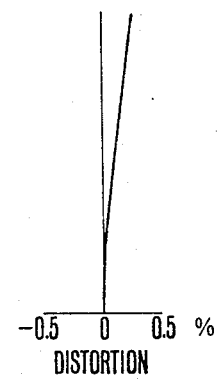
-0.5  0  0.5 mm
SPHERICAL ABERRATION
-0.5  0  0.5 mm
ASTIGMATISM
-0.5  0  0.5 %
DISTORTION
FIG.3G
FIG.3H
FIG.3I
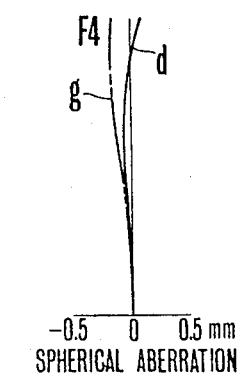
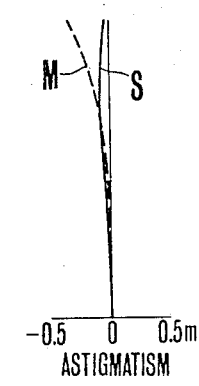
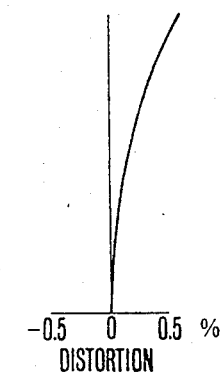
-0.5  0  0.5 mm
SPHERICAL ABERRATION
-0.5  0  0.5 mm
ASTIGMATISM
-0.5  0  0.5 %
DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

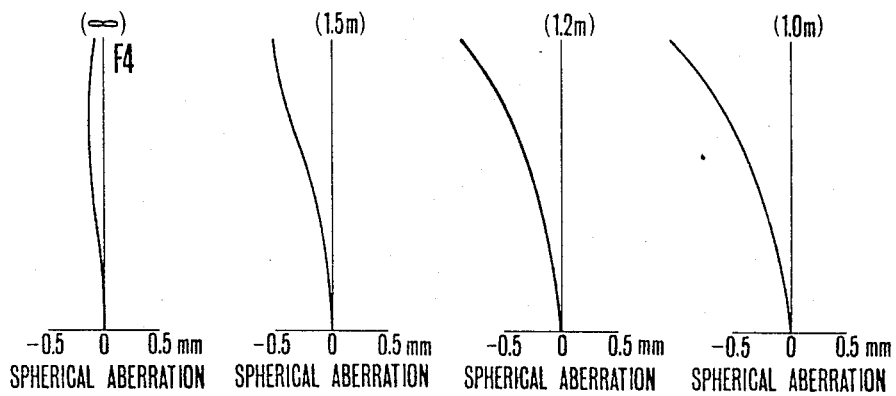
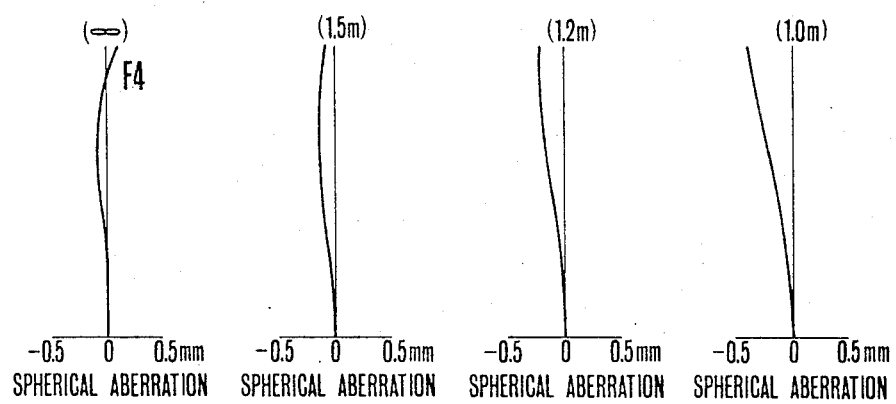
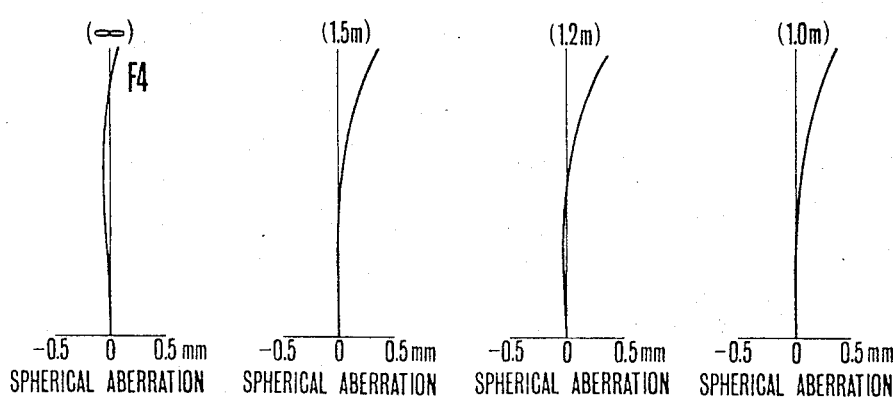

ZOOM LENS HAVING EXTENDED FOCUSING RANGE

This is a continuation of application Ser. No. 737,342, filed Nov. 1, 1976 now abandoned.

BACKGROUND OF THE INVENTION

This invention relates to zoom lenses having focusing provision made at the front component thereof, and, more particularly, to a method of controlling spherical aberration to be stabilized throughout the entire focusing range as extended toward shorter object distances.

Zoom lenses having their shortest focal lengths longer than 60 mm, or less to 55 mm. are commonly known as "telephoto type zoom lenses", examples of which are disclosed in U.S. Pat. Nos. 3,336,094 and 3,615,125. Of the many known telephoto type zoom lenses, there are some zoom lenses having focusing provisions for permitting close-up adjustment. However, about the shortest object distance they can achieve is on the order of 1.8 to 2 meters, and this can be done only by tolerating considerable image aberrations.

The prior art efforts to correct aberrations have generally been directed toward an object plane at infinity. With such lens systems, however, it is frequently necessary to focus down to shorter object distances but usually with some loss in aberration correction. Particularly when focusing is achieved by imparting an independent movement to one member of the lens system, it is found that aberrations are deteriorated to a large extents. This aberrational problem becomes serious when the focusing range is extended toward object distances shorter than 2 meters. For example, when the focusing provision is made at the front lens component as is usually employed in lens systems of the zoom type, it is very difficult to achieve good stabilization of correction of spherical aberration, coma, astigmatism and distortion throughout the focusing range particularly at the telephoto settings, although these aberrations are not seriously affected in the wide angle settings except for a change in sign of distortion from negative to positive.

In the past, variation of aberrations produced by a telephoto type zoom lens having a front component movable for focusing has been prevented by correcting the front component itself to a sufficient degree for objects at infinity by use of the ordinary lens design method. In this case, however, the number of lens elements necessary is increased with a corresponding increase in the weight and bulk of the forward part of the complete system and also in the physical length thereof to such a large extent that they cannot be kept within easily manageable proportions. It is also known to find the principal laws of correction of the aberrations for object points near the center of a distance between infinity and close-up. This method does, however, not enable the provision of a telephoto type zoom lens substantially free from variation with focusing of the aberrations, but only to distribute a certain amount of aberrations over the entire focusing range as well as over the zooming range.

SUMMARY OF THE INVENTION

The present invention has for its object the provision of a novel method of controlling variations of the aberrations with focusing to a minimum by means of a theoretically derived formula:

$$F(Ao,Lo) = \phi^3 h^4 Ao(1-\lambda^4-4a\delta+6a^2\delta^2) + 4\phi^2 h^2 Lo(-\delta+3a\delta^2 - \delta(a')^2 + \delta^2[2\phi(3+Po) + 3a'\overline{a'}]$$

Another object of the invention is to provide a telephoto type zoom lens having a front component movable for focusing and capable of providing focusing down to as short an object distance as 6.5 times the longest focal length of the zoom lens without introduction of the aberrations and particularly spherical aberration which is most seriously affected in the case of zoom lenses to prejudice the usefulness thereof in some applications.

BRIEF DESCRIPTION OF THE DRAWINGS

FIGS. 3A to 3I are similar graphic representations of Example 2 of a specific lens according to the invention.

FIGS. 5A to 5D are graphic representation of variations with focusing of spherical aberration of the line of Example 1 at the telephoto setting.

FIGS. 6A to 6D are similar graphic representations of the lens of Example 2.

FIGS. 7A to 7D are similar graphic representations of the lens of Example 3.

DESCRIPTION OF THE PREFERRED EMBODIMENT

Figure 1:
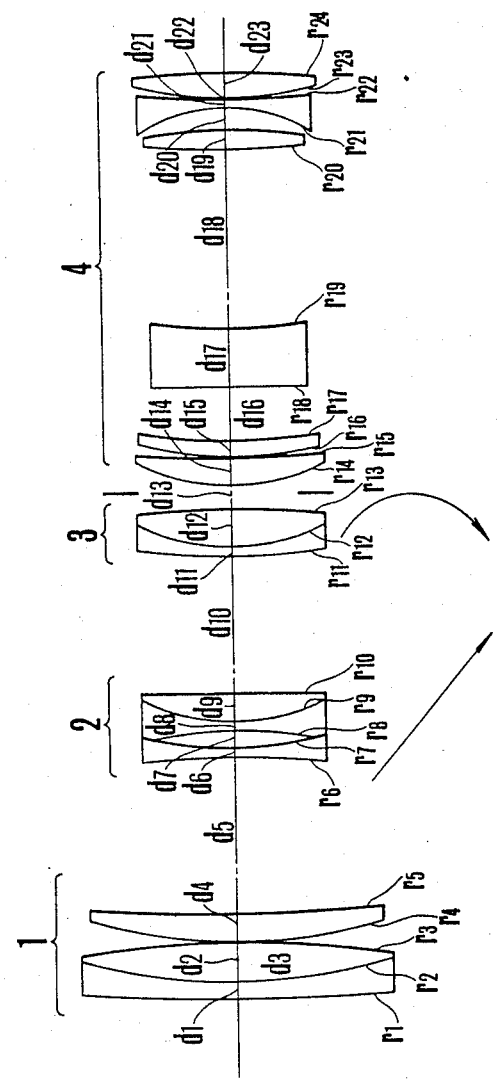
FIG. 1 is a block diagram of a practical example of the telephoto type zoom lens embodying the method of the present invention.

At first, the process for theoretical deduction of the formula for F(Ao, Lo) supra will be explained in connection with a telephoto type zoom lens having a front component axially movable for focusing and which may be followed by either a zooming control component or a stationary component during zooming bracketed by the focusing and zooming control components.

According to Yoshiya Matsui in his book "Lens Design" pp. 96–97, published by Kyoritsu Co., Ltd. Tokyo, when the position of an entrance pupil (or the axial distance between the first lens surface of the entire lens system and the entrance pupil plane) is shifted by an axial distance ($\Delta t$), the resulting 3rd-order aberration coefficients may be expressed as:

$$\begin{aligned}
I' &= I \\
II' &= II - \gamma I \\
III' &= III - 2\gamma II + \gamma^2 I \\
V' &= V - \gamma(3III + P) + 3\gamma II - \gamma^2 II - \gamma^3 I \\
&\text{in which } \gamma = (\overline{a})^2 \Delta t
\end{aligned} \quad (1)$$

wherein
I: 3rd-order spherical aberration coefficient of the front or first lens component (or focusing lens component);
II: 3rd-order coma coefficient of the first component;

III: 3rd-order astigmatism coefficient of the first component;
V: 3rd-order distortion coefficient of the first component;
P: Petzval sum;
$\bar{\alpha}$: the reduced angle of incidence of a pupil paraxial ray on the telephoto side;

When the object point is displaced from infinity to a finite distance, provided that the position of the entrance pupil is maintained constant, the resulting spherical aberration coefficient (I) may be expressed as:

$$\bar{I} = 1/\lambda^4[I - \delta\{4II + (\alpha')^2\} + \delta^2(6III + 2P + 3\alpha'\bar{\alpha}') - \delta^3\{4V + 3(\alpha')^2 - 3(\bar{\alpha})^2\} + \delta^4 Is] \quad (2)$$

in which $\delta = \lambda h \alpha; \lambda = \bar{\alpha}/\alpha$
wherein
$\alpha$: the reduced angle of incidence of an object paraxial ray on the telephoto side;
$\alpha'$: the reduced angle of emergence of the object paraxial ray on the telephoto side;
$h$: the height of incidence of the object paraxial ray on the telephoto side;
$\bar{\alpha}$: the reduced angle of incidence of a pupil paraxial principal ray on the telephoto side;
$\bar{\alpha}'$: the reduced angle of emergence of the pupil paraxial principal ray on the telephoto side;
$\bar{h}$: the height of incidence of the pupil paraxial principal ray on the telephoto side;
$\tilde{\alpha}$: the reduced angle of incidence of the object paraxial ray on the telephoto side with the object point being located at a distance equal to 6.5 times the longest focal length of the entire system;
$\tilde{\alpha}$: the reduced angle of incidence of the pupil paraxial principal ray on the telephoto side with the object point being located at a distance equal to 6.5 times the longest focal length of the entire lens system; and
Is: 3rd-order spherical aberration coefficient of pupil.
In connection with the formula (2), it should be explained that the values for all the parameters are in terms of the shortest focal length which is equated to unity.

When focusing is effected by imparting an independent movement to the first lens component alone, the formulae (1) and (2) must be combined with each other by substituting I, II, III and V by I', II', III' and V' respectively. Hence, we have:

$$\bar{I} = 1/\lambda^4[I - \delta\{4(II - \gamma I) + (\alpha')^2\} + \delta^2\{6(III + 2\gamma II + \gamma^2 I) + 2P + 3\alpha'\bar{\alpha}'\} - \delta^3\{4(V - \gamma(3III + P) + 3\gamma^2 II - \gamma^3 I) + 3(\alpha')^2 - 3(\bar{\alpha})^2\} + \delta^4 Is] \quad (3)$$

Now assuming that the focusing range for which good stabilization of correction of spherical aberration is achieved is limited at an object distance equal to 6.5 times the longest focal length of the entire lens system, the $\delta^3$ and $\delta^4$ terms may be neglected in practice, because $|\delta|$ is smaller than 1. On the other hand, as has been stated before, according to the method of the invention, there is no need to correct the focusing component itself for the various aberrations for an object plane at infinity to the degree that has heretofore been necessary in designing the prior art lens systems. Consequently, assume further that residual aberrations are introduced by the focusing component and are varied during focusing. Of these, particularly I and II are varied to large extents as compared with other aberrations, and further, the spherical aberration is most seriously affected by the focusing to result in the production of halo in the image. Moreover, as zooming is performed, the residual spherical aberration is varied at a rate almost equal to the fourth power of the zoom ratio, thus being objectionably increased at the telephoto settings.

In order that variation with focusing of spherical aberration is reduced to zero, it is required that $\bar{I} = I$. Equation (3) is complicated in form and inconvenient for use in determining the design parameters. As far as the movable components of a zoom lens are concerned, thin lens design may be applied (the axial separations between the successive lens surfaces in each block are reduced to zero) without unduly large loss in aberration correction. According to the thin lens theory, the various aberration coefficients for thick lens design may be expressed as:

$$\begin{aligned} I &= h^4\phi^3 Ao \\ II &= (\bar{h}/h)h^4\phi^3 Ao + h^2\phi^2 Lo \\ III &= (\bar{h}/h)^2 h^4\phi^3 Ao + 2(\bar{h}/h)h^2\phi^2 Lo + \phi \\ P &= \phi Po \\ V &= (\bar{h}/h)^3 h^4\phi^3 Ao + 3(\bar{h}/h)^2 h^2\phi^2 Lo + (\bar{h}/h)\phi(3 + Po) \end{aligned} \quad (4)$$

wherein
$\phi$: the refractive power of the first component having a value in terms of the shortest focal length which is equated to unity;
Ao: the eigen spherical aberration coefficient of the first component;
Lo: the eigen coma coefficient of the first component;
Po: the eigen coefficient of Petzval sum of the first component; and
by substituting this set of formulae (4) into equation (3) and deleting $\delta^3$ and $\delta^4$ terms, we have $$\bar{I} = 1/\lambda^4[h^4\phi^3 Ao - \delta\{4h^4\phi^3 aAo + 4h^2\phi^2 Lo + (\alpha')^2\} + \delta^2\{6h^4\phi^3 a^2 Ao + 12h^2\phi^2 aLo + 2\phi(3 + Po) + 3\alpha\bar{\alpha}'\}] \quad (5)$$

wherein $a = (\bar{h}/h) - \gamma$.
The theoretical condition for no variation with focusing of spherical aberration is that $\bar{I} = h^4\phi^3 Ao$. Hence, $$\phi^3 h^4 Ao(1 - \lambda^4 - 4a\delta + 6a^2\delta^2) + 4\phi^2 h^2 Lo(-\delta + 3a\delta^2) - \delta(\alpha')^2 + \delta\{2\phi(3 + Po) + 3\alpha'\bar{\alpha}'\} = 0 \quad (6)$$

It will be noticed that the values of $\lambda$, $\delta$, $\gamma$ and $\phi$ can be determined based on the power distribution in the focusing lens component at the paraxial region, and the values of Ao, Lo and Po can be determined by the configuration of the lens elements constituting the focusing component, while the values of the other factors must be calculated with the help of the conventional ray-tracing formulae. Because of the aberration difference between the thin and thick lens designs and of the omission of $\delta^3$ and higher terms, it follows that equation (6) may be deviated in numerical value to some extent.

Validity of equation (6) for stabilization of the spherical aberration during focusing has, therefore, been proved in actual practice, and it has now been found that, upon adjustment of the other aberrations within predetermined limits, the numerical value of the left side of equation (6) may lie between −0.25 and 0.25. That is, by putting the left side as F(Ao, Lo), we have $$-0.25 \leq F(Ao, Lo) \leq 0.25 \quad (7).$$

Inequality (7) has been applied to a telephoto type zoom lens illustrated in FIG. 1 as comprising four lens components optically aligned on a common axis. The first component 1 is convergent and axially movable for focusing. To effect zooming, the second and third components 2 and 3 are moved axially but in differential relation to each other, and have negative and positive refracting powers respectively. The fourth lens component 4 has a positive refracting power and functions as an image-forming lens or relay lens. The first and fourth components 1 and 4 remain axially stationary during the zooming. The forward or backward axial movement of the second component 2 for variation of the focal length of the complete lens is associated with the backward followed by forward axial movement of the third component 3 for image shift compensation in such a manner as to maintain a fixed focal plane throughout the zooming range. The fourth component comprises a front member (R14-R19) having a positive refractive power and a rear member (r20-r24) having a negative refractive power.

Prerequisites for equation (6) in the case of the zoom lens of the character described are the conditions that the focusing component as assumed to comprise a convergent front part, in the embodiment of FIG. 1, a doublet composed of a divergent singlet and a convergent singlet in this order from the front, and a convergent rear part, in the embodiment of FIG. 1, a singlet, is characterized by the following relationships:

(a) $2f_1 < Ff < 4f_1$ (b) $1.3f_1 < Fr < 2f_1$ (c) $0.8 < \phi_3/\phi_1 < 1.0$ (d) $0.4 < |\gamma_4 - \gamma_5/\gamma_4 + \gamma_5| < 1.0$ wherein
$f_1$: the focal length of the focusing component;
$Ff$: the focal length of the front part of the focusing component;
$Fr$: the focal length of the rear part of the focusing component;
$\phi_1$: the refracting power of the first surface of the front part;
$\phi_3$: the refracting power of the rearmost surface of the front part;
$\gamma_4$: the radius of curvature of the first surface of the rear part; and
$\gamma_5$: the radius of curvature of the rearmost surface of the rear part.

Requirements (a) and (b) are concerned with the power distribution between the front and rear parts of the focusing component determined as functions of Ao and Lo. The stronger the refractive power of the front part, the spherical aberration is the more over-corrected at closeup, and the weaker, the more under-correction is resulted. Requirements (c) and (d) are concerned with the lens configuration for the front and rear parts of the focusing component. The values of these parameters are directly determined from the values of Ao and Lo.

Ray-tracing calculations for such focusing component by equation (6) have been carried out, and the results with three distinct values of F(Ao, Lo) fallen within the range of inequality (7) but near the upper limit, the center and the lower limit thereof are shown in Examples Nos. 1, 2 and 3 respectively, in which the various lens parameters are specified to determine the numerical values of the factors of equation (6) though shown only for Example 1. Variation with focusing of the 3rd-order spherical aberration coefficient I at the telephoto setting is shown in Table 1 below

TABLE 1

| Object Distance | Example 1 | Example 2 | Example 3 |
| --- | --- | --- | --- |
| Infinity | 0.541 | 0.325 | 0.289 |
| 1.5 meters | 1.385 | 0.624 | −0.118 |
| 1.0 meter | 2.613 | 1.314 | −0.169 |

Figure 8:
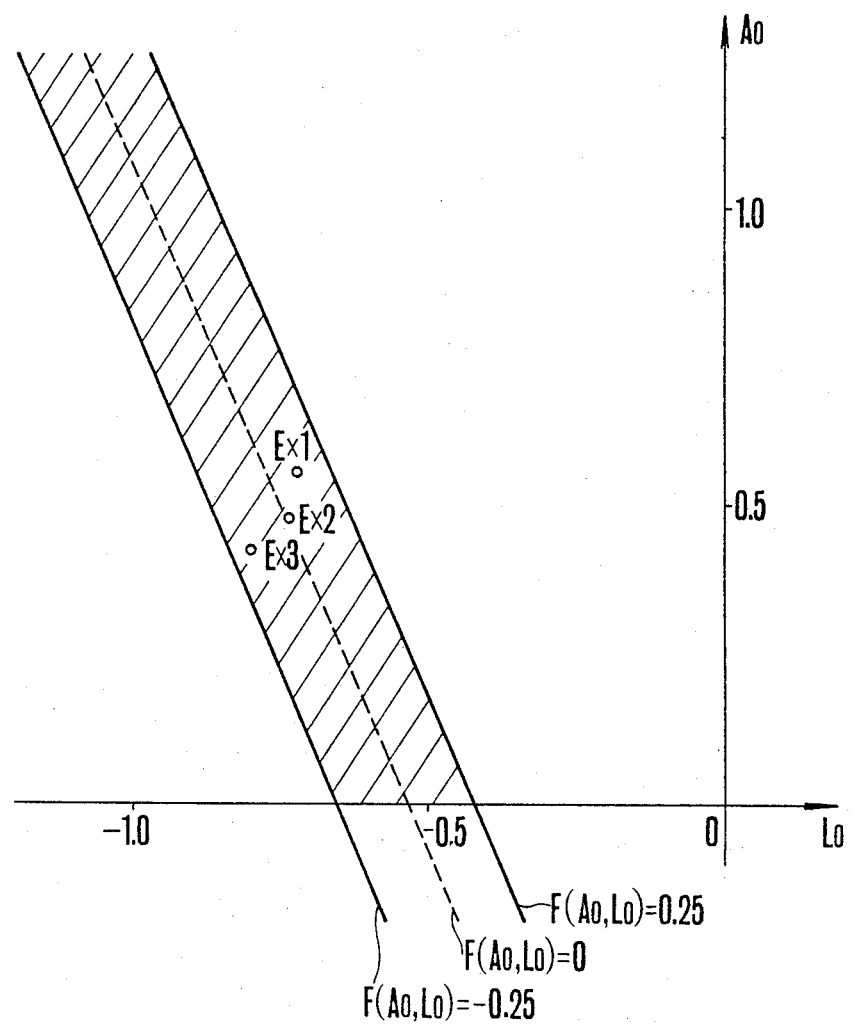
FIG. 8 is a graph showing an accepable range of values of the formula for F(Ao, Lo) supra for which the above-mentioned three examples are specified.

It is to be understood from Table 1 that, as focusing is effected from infinity to closeup at the very short object distances, the zoom lenses of Examples 1 and 3 provide respective spherical aberrations which are increased in the opposite senses to each other by magnitudes acceptable in actual practice, and therefore that it is possible to reduce to almost zero the degree of variation of spherical aberration during focusing by adjusting F(Ao, Lo) to a certain value, as can be seen also from FIGS. 5 to 7 showing the graphic representations of variation with focusing of spherical aberration of the zoom lenses of Examples 1 to 3 respectively. The relationship between the value of F(Ao, Lo) and the combination of values of Ao and Lo is graphically shown in FIG. 8. It is now to be noted that the conventional telephoto type zoom lens systems which though well corrected for aberrations provide focusing ranges limited at the shortest object distance of about 2 meters are generally characterized by having a focusing lens component of a configuration far deviated from that satisfying equation (6).

Figure 2A:
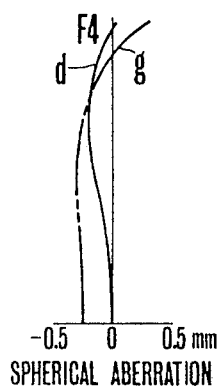
FIGS. 2A to 2I are graphic representations of variation with zooming of spherical aberration, astigmatism and distortion of Example 1 of a specific zoom lens according to the present invention with an object at infinity.
Figure 2B:
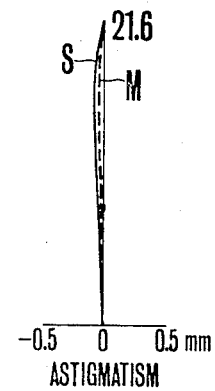
Figure 2C:
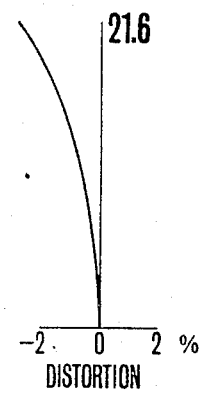
Figure 2D:
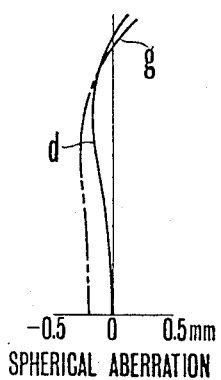
Figure 2E:
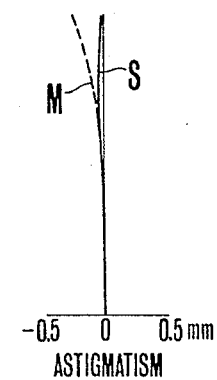
Figure 2F:
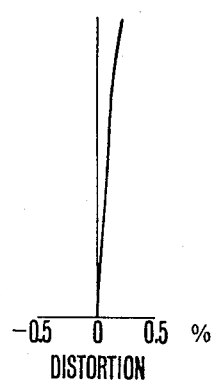
Figure 2G:
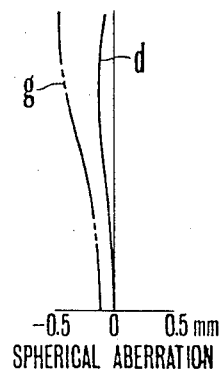
Figure 2H:
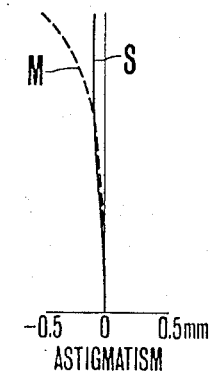
Figure 2I:
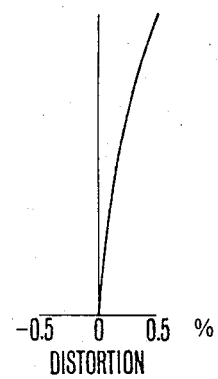
Figure 4:
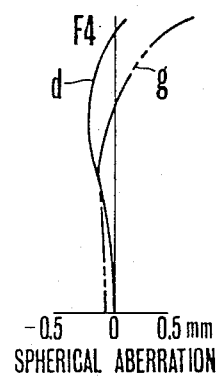
FIGS. 4A to 4I are similar graphic representations of Example 3 of a specific lens according to the invention.
Figure 4:
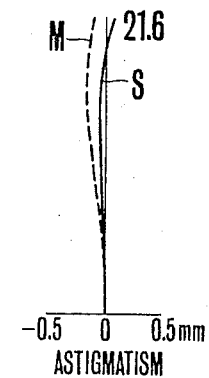
Figure 4:
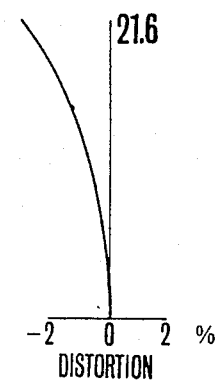
Figure 4:
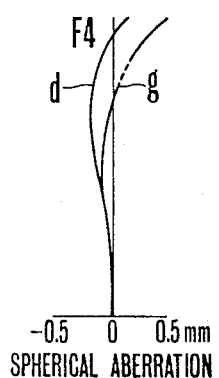
Figure 4:
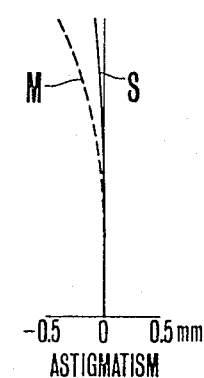
Figure 4:
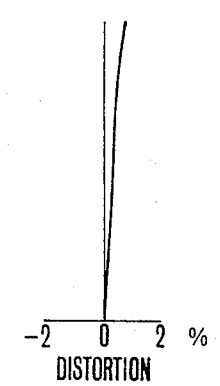
Figure 4:
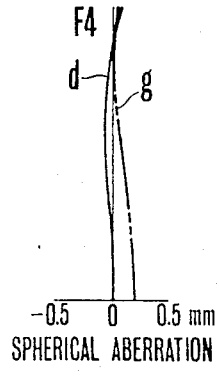
Figure 4:
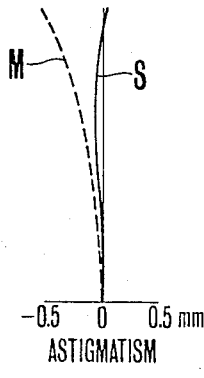
Figure 4:
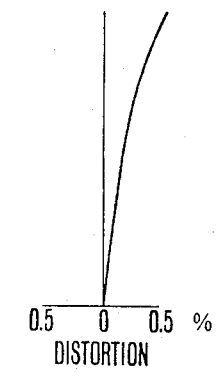

According to the present invention, however, good stabilisation of correction of the various aberrations not only throughout the zooming range but also throughout the extended focusing range down to as short an object distance as 1 meter can be achieved by constructing a telephoto type zoom lens in the form having the parameters as specified in Examples 1 to 3. The graphic representations of spherical aberration, astigmatism and distortion of Example 1 zoom lens are respectively shown in FIGS. 2A, 2B and 2C for the shortest focal length (wide angle) position, FIGS. 2D, 2E and 2F for the middle focal length position, and FIGS. 2G, 2H and 2I for the longest focal length (telephoto) position. The graphic representations of spherical aberration, astigmatism and distortion of Example 2 zoom lens are respectively shown in FIGS. 3A, 3B and 3C for the shortest focal length (wide angle) position, FIGS. 3D, 3E and 3F for the middle focal length position, and FIGS. 3G, 3H and 3I for the longest focal length (telephoto) position. The graphic representation of spherical aberration, astigmatism and distortion of the zoom lens of Example 3 are respectively shown in FIGS. 4A, 4B and 4C for the shortest focal length (wide angle) position, FIGS. 4D, 4E and 4F for the middle focal length position, and FIGS. 4G, 4H and 4I for the longest focal length (telephoto) position.

The following tables have the various symbols for the radii of curvature, r, the axial separations between the successive refracting surfaces, d, the indices of refraction, nd, for the spectral D line of sodium, and the Abbe numbers, vd, for the various lens elements. The plus and minus values of the radii, r, indicate surfaces respectively convex and concave toward indicent light. The equivalent focal length of the complete lens is designated by f, the F-number by F, and the equivalent focal lengths of the front and rear parts of the focusing lens component by fA and fB respectively.

EXAMPLE 1

TABLE 2

| | f = 81.002 − 194.441 F = 4.0 | | | |
|---|---|---|---|---|
| No. | r | d | vd | nd |
| 1 | 302.520 | 3.00 | 25.4 | 1.80518 |
| 2 | 99.733 | 6.03 | 61.1 | 1.58913 |
| 3 | −276.288 | 0.10 | | 1. |
| 4 | 87.859 | 4.89 | 61.1 | 1.58913 |
| 5 | 1521.034 | variable | | 1. |
| 6 | −249.143 | 1.60 | 53.9 | 1.71300 |
| 7 | 58.335 | 2.97 | | 1. |
| 8 | −75.381 | 1.60 | 53.9 | 1.71300 |
| 9 | 40.008 | 4.19 | 25.4 | 1.80518 |
| 10 | 370.373 | variable | | 1. |
| 11 | 104.198 | 1.60 | 33.8 | 1.64769 |
| 12 | 36.578 | 6.44 | 61.1 | 1.58913 |
| 13 | −129.164 | variable | | 1. |
| 14 | 38.933 | 4.44 | 64.1 | 1.51633 |
| 15 | 196.561 | 0.20 | | 1. |
| 16 | 50.740 | 2.52 | 64.1 | 1.51633 |
| 17 | 88.080 | 9.11 | | 1. |
| 18 | −665.751 | 9.70 | 28.3 | 1.74000 |
| 19 | 87.891 | 29.98 | | 1. |
| 20 | 149.168 | 3.12 | 49.3 | 1.60729 |
| 21 | −65.259 | 3.59 | | 1. |
| 22 | −26.327 | 1.50 | 53.3 | 1.69350 |
| 23 | 237.160 | 0.10 | | 1. |
| 24 | 59.971 | 3.97 | 49.3 | 1.60729 |
| 25 | −164.859 | | | 1. |

TABLE 3

Lens separation during zooming with object at infinity

| f | d5 | d10 | d13 |
|---|---|---|---|
| 81.002 | 3.923 | 37.211 | 12.000 |
| 125.998 | 26.143 | 22.926 | 4.065 |
| 194.441 | 40.223 | 1.197 | 11.713 |

TABLE 4

Lens parameter for focusing component $\phi_3/\phi_1 = 0.801$; $(\gamma_4 + \gamma_5) = 0.891$; $f_A = 3.395f_1$; $f_B = 1.408f_1$

TABLE 5

Factors of equation (6) for $F(A_o, L_o) = 0.13$ with object at 1.3 meters from image plane

| | | |
|---|---|---|
| $\lambda = 0.8064$ | $P_o = 0.675$ | $\bar{a} = 0.4167$ |
| $a = -0.4486$ | $\phi = 0.7218$ | $\bar{a}' = -0.9072$ |
| $\delta = -0.3698$ | | $\bar{h} = -0.6795$ |
| $\gamma = 0.1655$ | $\alpha = 0$ | |
| $\Delta t = 0.9532$ | $\alpha' = 1.7323$ | $\tilde{g} = -0.1911$ |
| $A_o = 0.55$ | $h = 2.4$ | $\tilde{a} = -0.3360$ |
| $L_o = -0.72$ | | |

EXAMPLE 2

TABLE 6

| | f = 81.002-194.441 F = 4.0 | | | |
|---|---|---|---|---|
| No | r | d | vd | nd |
| 1 | 299.582 | 3.00 | 25.4 | 1.80518 |
| 2 | 99.340 | 6.40 | 61.1 | 1.58913 |
| 3 | −223.035 | 1.10 | | 1. |
| 4 | 85.752 | 4.89 | 61.1 | 1.58913 |
| 5 | 535.718 | variable | | 1. |
| 6 | −303.748 | 1.60 | 53.9 | 1.71300 |
| 7 | 58.079 | 2.97 | | 1. |
| 8 | −74.086 | 1.60 | 53.9 | 1.71300 |
| 9 | 39.082 | 4.19 | 25.4 | 1.80518 |
| 10 | 321.421 | variable | | 1. |
| 11 | 102.994 | 1.60 | 33.8 | 1.64769 |
| 12 | 35.328 | 6.44 | 61.1 | 1.58913 |
| 13 | −129.625 | variable | | 1. |

TABLE 6-continued

| | f = 81.002-194.441 F = 4.0 | | | |
|---|---|---|---|---|
| No | r | d | vd | nd |
| 14 | 38.933 | 4.44 | 64.1 | 1.51633 |
| 15 | 196.503 | 0.20 | | 1. |
| 16 | 50.668 | 2.52 | 64.1 | 1.51633 |
| 17 | 88.204 | 9.11 | | 1. |
| 18 | −649.191 | 9.79 | 28.3 | 1.74000 |
| 19 | 87.775 | 30.01 | | 1. |
| 20 | 150.725 | 3.36 | 49.3 | 1.60729 |
| 21 | −65.259 | 3.59 | | 1. |
| 22 | −26.416 | 1.50 | 53.3 | 1.69350 |
| 23 | 223.506 | 0.10 | | 1. |
| 24 | 62.316 | 3.97 | 49.3 | 1.60729 |
| 25 | −144.433 | | | 1. |

TABLE 7

Lens separation during zooming with object at infinity

| f | d5 | d10 | d13 |
|---|---|---|---|
| 81.002 | 3.540 | 37.346 | 12.000 |
| 126.000 | 25.760 | 23.061 | 4.065 |
| 194.441 | 39.840 | 1.332 | 11.713 |

TABLE 8

Lens parameter for focusing component and factors of equation (6) for $F(A_o, L_o) = 0.01$

| | |
|---|---|
| $A_o = 0.48$ | $\phi_3/\phi_1 = 0.983$ |
| $L_o = -0.74$ | |
| $P_o = 0.675$ | $\left\|\dfrac{\gamma_4 - \gamma_5}{\gamma_4 + \gamma_5}\right\| = 0.724$ |
| | $f_A = 2.831f_1$ |
| | $f_B = 1.538f_1$ |

EXAMPLE 3

TABLE 9

| | f = 81.002-195.953 F = 4.0 | | | |
|---|---|---|---|---|
| No. | r | d | vd | nd |
| 1 | 227.118 | 3.00 | 25.4 | 1.80518 |
| 2 | 88.134 | 7.10 | 61.1 | 1.58913 |
| 3 | −190.340 | 0.12 | | 1. |
| 4 | 84.001 | 4.00 | 61.1 | 1.58913 |
| 5 | 258.137 | variable | | 1. |
| 6 | −434.491 | 1.65 | 53.9 | 1.71300 |
| 7 | 59.585 | 3.42 | | 1. |
| 8 | −70.381 | 1.65 | 53.9 | 1.71300 |
| 9 | 38.256 | 4.10 | 25.4 | 1.80518 |
| 10 | 270.377 | variable | | 1. |
| 11 | 103.961 | 1.70 | 33.8 | 1.64769 |
| 12 | 34.800 | 6.20 | 61.1 | 1.58913 |
| 13 | −127.335 | variable | | 1. |
| 14 | 39.670 | 4.40 | 64.1 | 1.51633 |
| 15 | 164.427 | 0.60 | | 1. |
| 16 | 45.831 | 3.20 | 64.1 | 1.51633 |
| 17 | 83.201 | 11.40 | | 1. |
| 18 | −676.679 | 2.50 | 28.3 | 1.74000 |
| 19 | 81.229 | 31.90 | | 1. |
| 20 | 240.235 | 3.60 | 49.3 | 1.60729 |
| 21 | −67.781 | 5.20 | | 1. |
| 22 | −25.661 | 2.00 | 57.0 | 1.62280 |
| 23 | −232.607 | 0.12 | | 1. |
| 24 | 52.780 | 3.10 | 49.3 | 1.60729 |
| 25 | 230.978 | | | 1. |

TABLE 10

Lens separation during zooming with object at infinity

| f | d5 | d10 | d13 |
|---|---|---|---|
| 81.002 | 2.932 | 37.343 | 12.000 |
| 125.998 | 25.152 | 23.058 | 0.850 |
| 195.953 | 39.432 | 0.850 | 11.993 |

TABLE 11

Lens parameter for focusing component and
factor of equation (6) for F(Ao, Lo) = −0.18

| | |
|---|---|
| Ao = 0.42 | $\phi_3/\phi_1 = 0.873$ |
| Lo = −0.80 | |
| Po = 0.675 | $\left\| \dfrac{\gamma_4 - \gamma_5}{\gamma_4 + \gamma_5} \right\| = 0.509$ |
| $f_A = 2.136fI$ | $f_B = 1.867fI$ |

What is claimed is:

1. A zoom lens having a focusing range extended toward shorter object distances and comprising:
   a focusing lens component having a positive refractive power, composed of a biconvex lens means followed by a positive meniscus lens of forward convexity, axially movable for focusing;
   a variation lens component having a negative refractive power, axially movable for variation in focal length of said zoom lens and positioned on the image side of said focusing lens component;
   a compensation lens component positioned on the image side of said variation lens component and axially movable along with said variation lens component;
   a basic lens component having a positive refractive power and positioned on the image side of said compensation lens component; and
   said focusing lens component fulfilling the following relationship, $0.8 < \phi_3/\phi_1 < 1.0$ wherein
   $\phi_1$ is the refractive power of the frontmost lens surface of said biconvex lens means within said focusing lens component;
   $\phi_3$ is the refractive power of the rearmost lens surface of said biconvex lens means within said focusing lens component.

2. A zoom lens as described in claim 1, wherein said focusing lens component is composed of a biconvex compound lens being composed of a negative meniscus lens and a biconvex lens cemented together and a positive meniscus lens with its convex surface directed toward the object side, said variation lens component is composed of a biconcave lens and a negative compound lens being composed of a biconcave lens and a positive lens cemented together, said compensation lens component is composed of a biconvex compound lens being composed of a negative meniscus lens and a biconvex lens cemented together, and said compensation lens component is movable during zooming, back and forth to approach the object at both ends of the zooming range.

3. A zoom lens having a focusing range extended toward shorter object distances and comprising:
   a focusing lens component having a positive refractive power, composed of a biconvex lens means followed by a positive meniscus lens of forward convexity, axially movable for focusing;
   a variation lens component having a negative refractive power, axially movable for variation in focal length of said zoom lens and positioned on the image side of said focusing lens component;
   a compensation lens component positioned on the image side of said variation lens component and axially movable along with said variation lens component;
   a basic lens component having a positive refracting power and positioned on the image side of said compensation lens component; and
   said focusing lens component fulfilling the following relationship, $0.8 < \phi_3/\phi_1 < 1.0$ wherein
   $\phi_1$ is the refracting power of the frontmost lens surface of said biconvex lens means within said focusing lens component;
   $\phi_3$ is the refracting power of the rearmost lens surface of said biconvex lens means within said focusing lens component;
   wherein said focusing lens component is composed of a biconvex compound lens being composed of a negative meniscus lens and a biconvex lens cemented together and a positive meniscus lens with its convex surface directed toward the object side, said variation lens component is composed of a biconcave lens and a negative compound lens being composed of a biconcave lens and a positive lens cemented together, said compensation lens component is composed of a biconvex compound lens being composed of a negative meniscus lens and a biconvex lens cemented together, and said compensation lens component is movable during zooming, back and forth to approach the object at both ends of the zooming range and wherein a basic lens component is composed of two positive meniscus lenses with their convex surfaces directed toward the object, a negative lens, a biconvex lens, a biconcave lens and a biconvex lens.

* * * * *